United States Patent [19]

Shaw

[11] Patent Number: 4,748,820

[45] Date of Patent: Jun. 7, 1988

[54] REFRIGERATION SYSTEM

[75] Inventor: David N. Shaw, Unionville, Conn.

[73] Assignee: Copeland Corporation, Sidney, Ohio

[21] Appl. No.: 1,213

[22] Filed: Jan. 7, 1987

Related U.S. Application Data

[63] Continuation-in-part of Ser. No. 863,593, May 15, 1986, which is a continuation-in-part of Ser. No. 636,068, Jul. 30, 1984, Pat. No. 4,594,858, which is a continuation of Ser. No. 569,886, Jan. 11, 1984, abandoned.

[51] Int. Cl.⁴ ............................................. F25B 7/00
[52] U.S. Cl. ...................................... 62/175; 62/473; 62/510
[58] Field of Search ................ 62/175, 510, 228.5, 62/513, 473, 196.2

[56] References Cited

U.S. PATENT DOCUMENTS

| | | | |
|---|---|---|---|
| Re. 29,621 | 5/1978 | Conley et al. | 62/510 X |
| 1,984,250 | 12/1934 | Chamberlain . | |
| 2,386,198 | 10/1945 | Dodson . | |
| 2,434,221 | 1/1948 | Newton . | |
| 2,585,908 | 2/1952 | Backstrom . | |
| 2,677,944 | 5/1954 | Ruff . | |
| 2,841,962 | 7/1958 | Richards . | |
| 2,903,248 | 9/1959 | Walker . | |
| 3,232,524 | 2/1966 | Rice et al. . | |
| 3,237,852 | 3/1966 | Shaw | 417/338 |
| 3,307,368 | 3/1967 | Harnish | 62/160 |
| 3,398,551 | 8/1968 | Yannascoh | 62/196.1 |
| 3,513,662 | 5/1970 | Golber | 62/175 X |
| 3,668,883 | 6/1972 | Ruff et al. | 62/158 |
| 3,759,052 | 9/1973 | Inoue | 62/115 |
| 4,102,149 | 7/1978 | Conley et al. | 62/510 X |
| 4,180,986 | 1/1980 | Shaw | 62/473 X |
| 4,316,366 | 2/1982 | Manning | 62/513 X |
| 4,325,223 | 4/1982 | Cantley | 62/126 |
| 4,332,144 | 6/1982 | Shaw | 62/324.1 |
| 4,435,962 | 3/1984 | Mochizuki et al. | 62/175 |
| 4,550,574 | 11/1985 | Hohman | 62/197 |
| 4,554,799 | 11/1985 | Pallanch | 62/509 |
| 4,577,468 | 3/1986 | Nunn, Jr. et al. | 62/113 |

FOREIGN PATENT DOCUMENTS

| | | | |
|---|---|---|---|
| 0076716 | 4/1983 | European Pat. Off. | 62/510 |
| 0126673 | 11/1984 | European Pat. Off. | 62/510 |
| 2039386A | 8/1980 | United Kingdom . | |

OTHER PUBLICATIONS

Hussmann Information Sheet "Thermoficient Food Store Refrigeration Package".

Primary Examiner—William E. Wayner
Attorney, Agent, or Firm—Harness, Dickey & Pierce

[57] ABSTRACT

A unique multi-stage refrigeration system for multiple product-display cases in which each display case has a low-stage booster compressor disposed therein. Each booster compressor compresses refrigerant received from the evaporator in its display case and feeds same to a bank of high-stage compressors disposed in a remotely located equipment room. A mechanical sub-cooler is provided for controlling liquid refrigerant temperature, and an improved lubrication system is provided for balancing the distribution of lubricant throughout the system. Several modifications of the system are also shown.

58 Claims, 3 Drawing Sheets

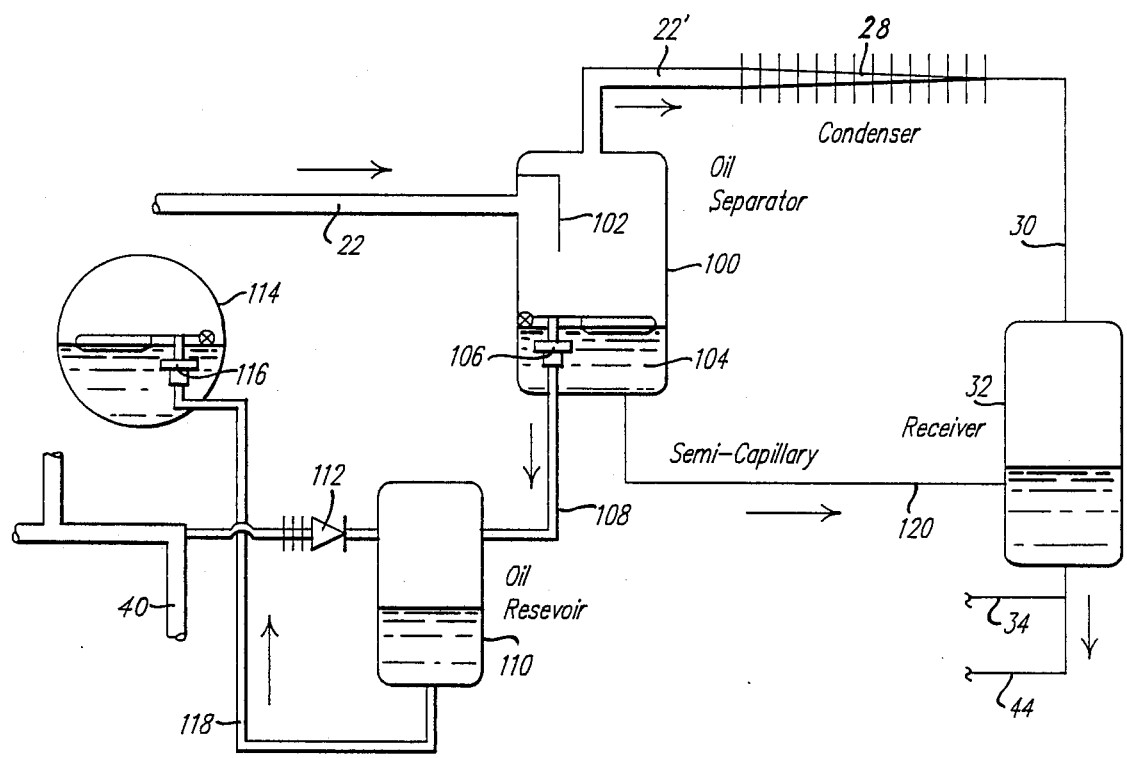
_FIG. 2._
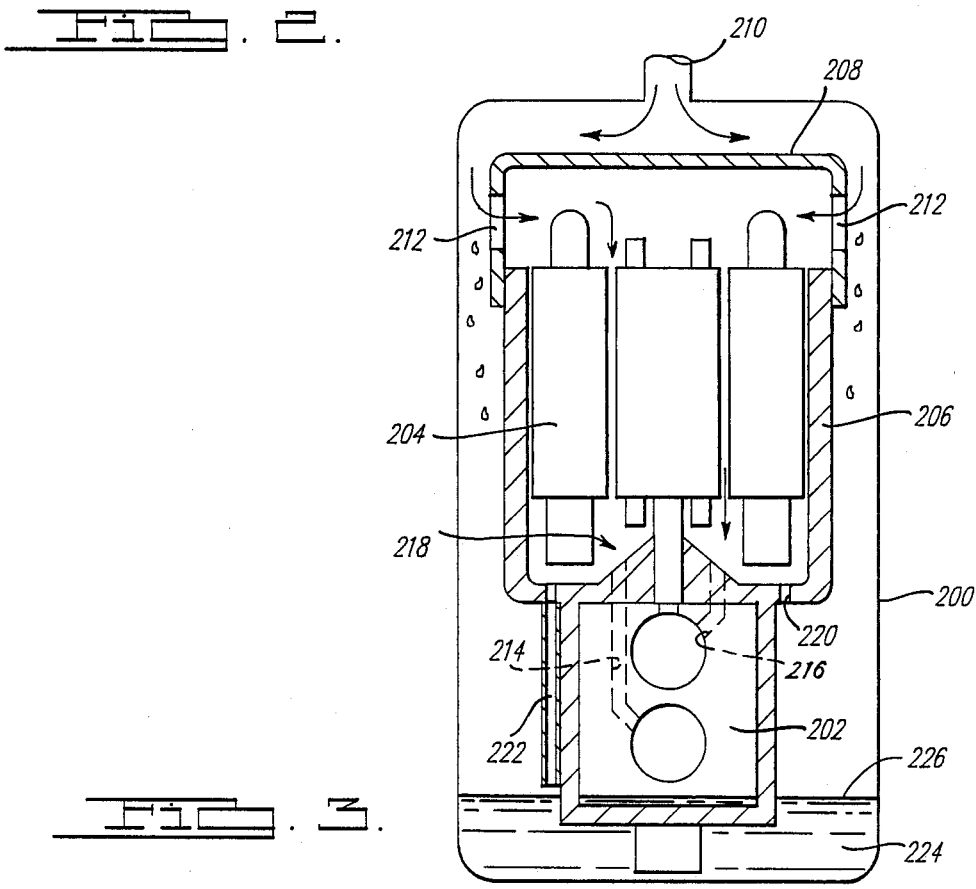
_FIG. 3._

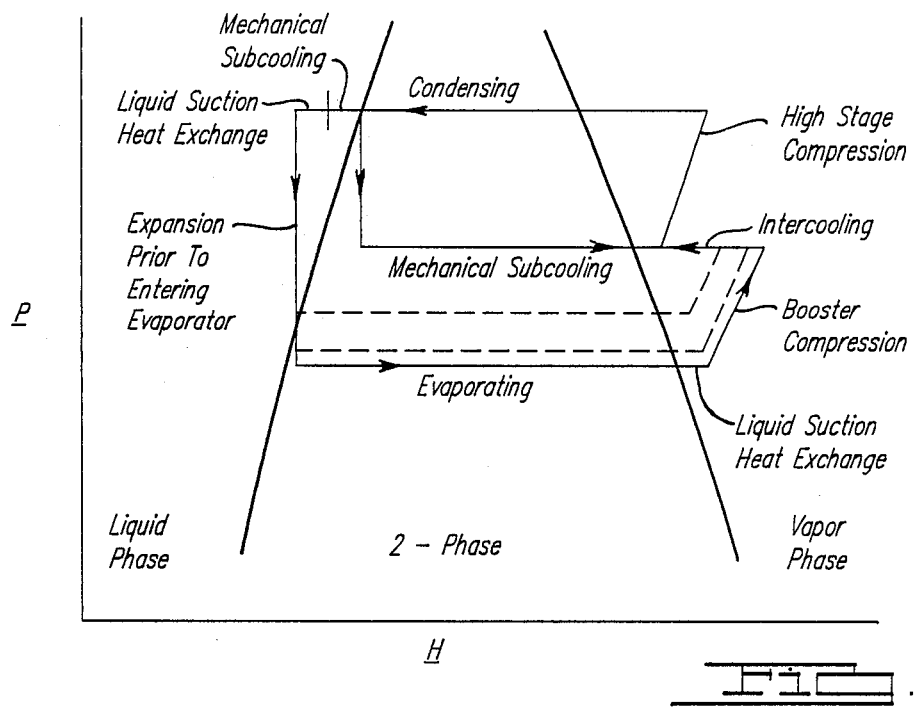
FIG. 4.
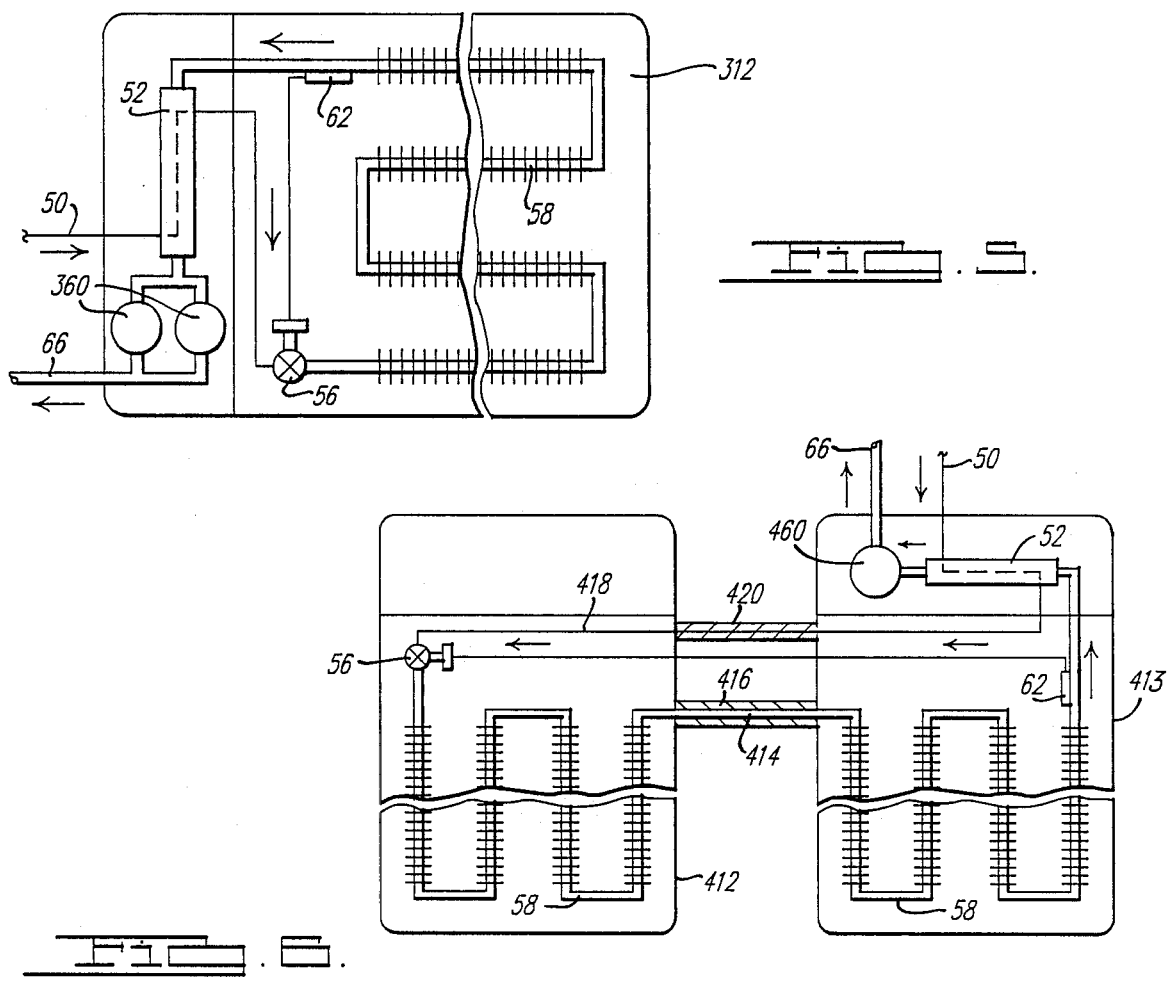
FIG. 5.
FIG. 6.

REFRIGERATION SYSTEM

CROSS-REFERENCE TO RELATED APPLICATION

This application is a continuation-in-part of U.S. application Ser. No. 863,593, filed May, 15, 1986 which is a continuation-in-part of U.S. application Ser. No. 636,068, filed July 30, 1984 (now U.S. Pat. No. 4,594,858), which is a continuation of U.S. application Ser. No. 569,886, filed Jan. 11, 1984, now abandoned.

BACKGROUND AND SUMMARY OF THE INVENTION

The present invention relates to refrigeration systems and more specifically to an improved multi-stage refrigeration system particularly suited to supermarket refrigeration.

A typical supermarket has many different refrigerated display cases containing various food items held at different temperatures. Normally, these display cases each contain their own refrigerant evaporator, which is connected via refrigerant lines to remotely located condensing equipment (compressor and condensers). Some smaller convenience stores have only a few display cases, which in some instances have the entire condensing apparatus contained within the confines of the display case itself. While this arrangement may be satisfactory for a small store, a larger supermarket with many display cases would suffer from noise, wasted space, and disruptive maintenance if it was so equipped.

The present invention resides in the provision of a system which combines some of the more advantageous features of both such known systems and adds a whole new dimension, for significantly improved performance, efficiency and economy. The present invention also incorporates a unique, very simple, reliable lubrication system ideally suited for the refrigerating system of the present invention.

In an exemplary embodiment of the system of the present invention each display case contains a low horsepower full hermetic booster compressor and a suction/liquid heat exchanger, in addition to the usual evaporator. Each booster compressor thus operates with a relatively constant evaporating pressure, as well as with a low and relatively constant discharge pressure. Furthermore, each compressor is modulated or cycled to control only its own case temperature. Each booster compressor can be small, very quiet, and is located in an enclosed compartment within the display case. In most applications they will require no cooling airflow whatsoever.

The condensing apparatus remains remotely located and, in turn, modulates in order to maintain a controlled pressure sink for the refrigerant vapor received from all of the display case boosters. The condensing apparatus also preferably incorporates a refrigerant subcooler which serves to generate a cool pressurized liquid source for the display cases. The refrigerant vapor generated by the subcooler is blended with the vapor returning from the display case boosters prior to entering the inlet of the condensing apparatus compressors. The system has much in common with the multi-stage system disclosed in applicant's above-identified parent applications (the disclosures of which are herein incorporated by reference), with the significant difference being that the present low-stage compressors are the booster compressors disposed in the display cases, remote from the condensing equipment location and the high-stage compressors.

With the present invention, the vapor lines leaving the display cases will be smaller than usual and will be warmer than internal store ambient temperatures. Thus, no insulation will be required as it is desirable that these vapor lines lose some of their superheat enroute to the condensing apparatus compressors. This interstage heat rejection significantly enhances the overall efficiency of the system. Furthermore, refrigerant R-22 can be utilized as the sole refrigerant from the overall system with no danger of overheating because the high-stage compressors will receive vapor at pressures and temperatures comparable to that received by air conditiioning compressors. This is, of course, desirable because R-22 is not an ozone depleting refrigerant and because it has ideal characteristics for use in the present system (i.e., relatively low density and high latent heat).

The system of the present invention always operates at a high efficiency level (with attendant minimum operating cost) and gives the additional benefit of precise control of each individual display cases temperature, with no efficiency penalty associated with that individual control. High system efficiency results from the following:

1. All system compressors always operate at moderate pressure ratios, thus allowing operation at improved overall efficiency levels.

2. Mechanical liquid subcooling economies are always present and require only an additional heat exchanger within the condensing apparatus.

3. Liquid/suction heat exchange takes place effectively within the confines of the display case, with no overheating danger because the entering liquid temperature is controlled.

4. Low-stage booster compressor discharge vapor cooling occurs freely by exposure to store ambient conditions, which significantly enhances system efficiency by reducing the volume of vapor to be compressed by the high-stage compressors.

5. No deliberate efficiency ribbing pressure drop between evaporator pressure and compressor suction pressure is required for control purposes such as is the case with current systems equipped with evaporator pressure regulators.

6. Condensing pressures are allowed to fall as the outdoor ambient temperature falls, and sufficient subcooling for liquid feed purposes is always maintained by the subcooling heat exchanger, even under low ambient temperatures when high-stage compressor operation may be terminated.

Additional factors which are very important in the selection of a supermarket refrigeration system include reliability, noise, and cost. As will become apparent, the system of the present invention offers significant benefits in each of these areas as well.

Additional objects, advantages and features of the present invention will become apparent from the following description and the appended claims, taken in conjunction with the accompanying drawings.

BRIEF DESCRIPTION OF THE DRAWINGS

FIG. 2 is a diagrammatic view illustrating a high-stage oil control system incorporating the principles of the present invention;

FIG. 3 is a diagrammatic sectional view of a portion of a typical hermetic refrigeration compressor illustrating a low-stage oil control technique embodying the principles of the present invention;

FIG. 4 is a typical pressure-enthalpy diagram for the system of FIG. 1 utilizing R-22 refrigerant;

FIG. 5 is a diagrammatic view of a portion of the system of FIG. 1, showing a modification thereof; and FIG. 6 is a diagrammatic view of a portion of the system of FIG. 1, showing another modification thereof.

DETAILED DESCRIPTION OF THE PREFERRED EMBODIMENTS

Figure 1:
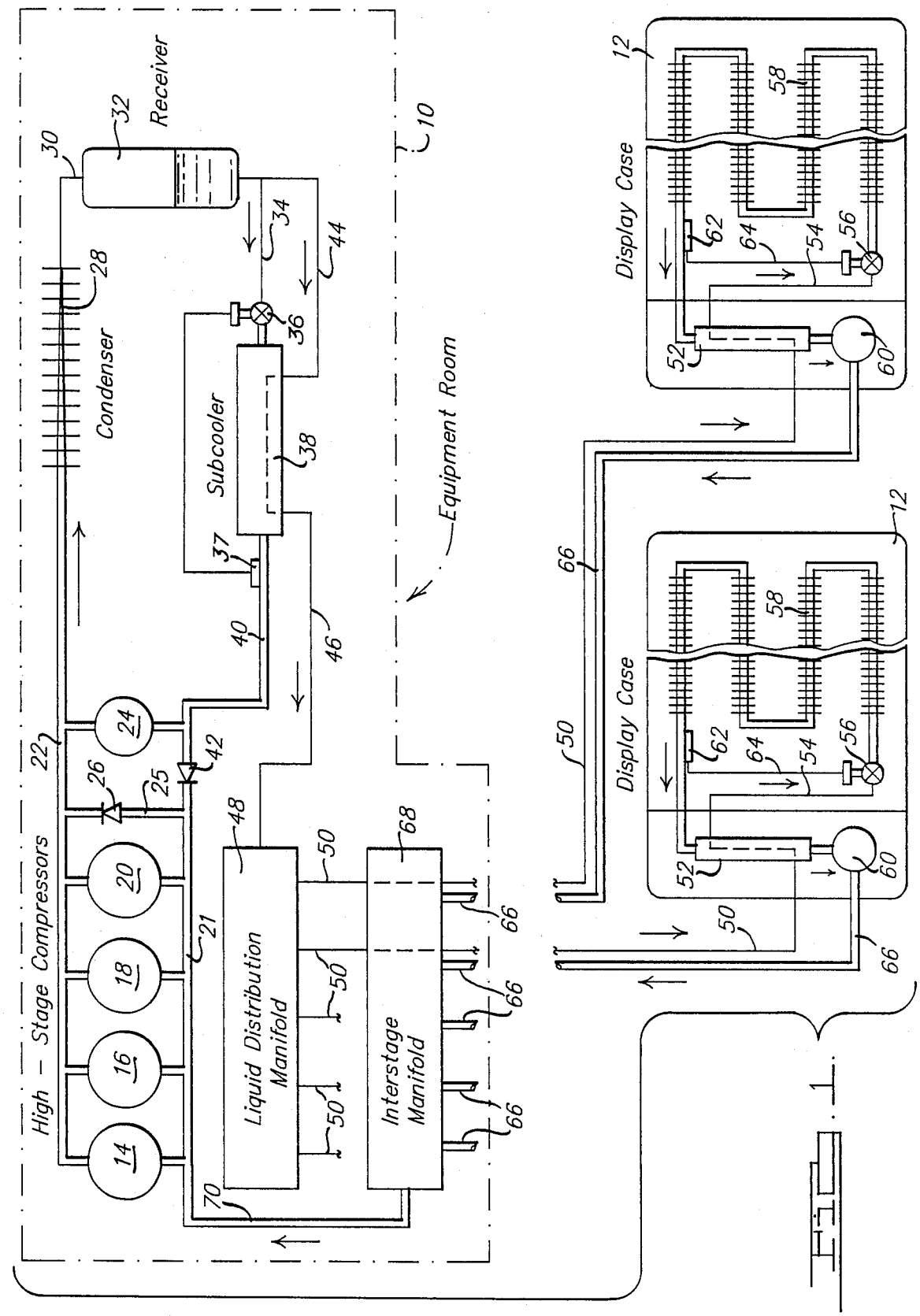
FIG. 1 is a diagrammatic view of an overall refrigeration system incorporating the principles of the present invention and suited for a typical supermarket installation.

With reference to FIG. 1, the apparatus of the present system is disposed in two or more distinct locations, i.e. an equipment room, indicated at 10, and a plurality of remotely disposed display cases 12 each of which defines a distinct refrigerating or product cooling zone or location remote from the equipment room, or at least disposed a substantial distance therefrom. Disposed in the equipment room are a plurality of high-stage compressors 14, 16, 18 and 20 all connected in parallel between a suction line 21 and a discharge line 22. Although four are shown, any number can be used, depending on the size of the sytem and the capacity of the compressors used. compressors 14–20 can be of any suitable type and may be modulated in any known manner, such as by cycling individual compressors on and off or providing one or more of them with a variable speed drive.

Optionally, an additional trimmer compressor 24 may be provided, in parallel with compressors 14–20. Trimmer compressor 24 would be a relatively smaller capacity compressor operating continuously. When the high-stage is off (i.e. at low ambient temperatures, for example less than 40 degrees F.), compressor 24 would generate in the order of 10 degrees F. of sub-cooling under rated system load, or more under reduced system load. Compressor 24 can alternatively be of variable speed and operate to trim or balance the system under all condensing conditions (e.g. decrease trimmer speed before shutting off another high-stage compressor, or increase trimmer speed before energizing an off high-stage compressor), however such is not required. A bypass live 25 having a check valve 26 therein is provided in parallel with the compressors between suction line 21 and discharge line 22 to provide a bypass when the high-stage compressors are off.

Compressed gaseous refrigerant flows from discharge line 22 to condenser 28 (located either in the equipment room or outside, and remote from all of the display cases) where it is condensed in the usual manner to a relatively warm liquid, which flows through a liquid line 30 to a conventional receiver 32. A portion of the warm liquid refrigerant taken from the bottom of receiver 32 flows through a liquid line 34 to an expansion valve 36 (controlled by a sensor 37), from which the expanded refrigerant flows through a sub-cooler 38 to a line 40 communicating directly with suction line 22 via a check valve 42 which prevents reverse flow. The remaining portion of the warm liquid refrigerant flowing from the bottom of receiver 32 travels via a liquid line 44 to sub-cooler 38, where it is cooled by the expanded refrigerant flowing through expansion valve 36, the resulting cooled liquid refrigerant then flowing from the sub-cooler through a line 46 to a liquid distribution manifold 48.

Liquid refrigerant under pressure is supplied to each display case 12 by means of a liquid line 50 which interconnects liquid distribution manifold 48 and a liquid/suction heat exchanger 52 disposed in the display case, where it is precooled by the cold refrigerant leaving the evaporator. From heat exchanger 52 the cooled liquid flows via a liquid line 54 to an expansion valve 56. Reduced pressure refrigerant leaving expansion valve 56 then flows through a conventional evaporator coil 58 to cool the product disposed in the display case, and from there is flows through heat exchanger 52 into the suction side of a booster compressor 60 disposed within display case 12. Expansion valve 56 is controlled in a typical manner by the pressure and temperature of the gaseous refrigerant leaving evaporator 58, the latter being sensed by a sensor 62 connected to the expansion valve by a line 64. Each booster compressor 60 acts as a system low stage compressor and is controlled solely by the cooling demand of the refrigerating zone in the display case in which it is disposed. The output from each booster compressor is communicated by a gas discharge line 66 to an inter-stage manifold 68 which in turn communicates directly with suction line 21 via a line 70. Since discharge line 66 is warm, the system has free interstage cooling of the refrigerant en route to the condensing equipment room. In addition to increasing efficiency, this reduces store heating requirements and keeps the refrigerant line trenches dry, eliminating the normal condensation (which often creates a breeding ground for insects and bacteria). Liquid line 50 is preferably insulated to avoid direct heat exchange with vapor line 66, if they are located in the same trench. Although two are shown, any number of display cases can be provided, depending on the size of the system. Typically, a moderately sized supermarket may contain thirty or more refrigerated display cases.

Since each refrigerating zone (each of which has a different cooling demand) has its own compressor each zone can be individually controlled, such as by a conventional inexpensive, reliable refrigerator-type thermostat, which acts to both allow refrigerant flow and compressor operation on rising case temperature and to terminate same upon falling case temperature. Expansion valve 56 can be solenoid operated so that it can be positively closed in response to the action of the thermostat to prevent liquid accumulation in the evaporator and compressor. Each case can be at a different temperature and no secondary controls are necessary. Furthermore, each booster compressor can be matched in capacity to the design of the display case, thus giving the display case manufacturer more over his product. If the booster compressor is of fixed speed, it can be cycled on and off, and if it is of variable speed its speed can be varied in response to display case cooling demand (temperature). The cost penalty of using variable speed booster compressors may not be significant because they are of such low horsepower (e.g. approximately 0.25 to 2.50 horsepower) that inexpensive inverters can be used for control. Noise and vibration are minimal because only small horsepower booster compressors are required and because they operate at relatively low compression ratios.

One problem often encountered in multiple compressor systems is the migration of oil to certain of the compressors, rather than being relatively uniformly distributed throughout the system, which ultimately if not controlled can cause lubricant starvation of one or more compressors. Applicant has discovered a very effective technique to handle lubrication of all the compressors in the present system. The basic premise of applicant's concept is the use of the liquid refrigerant lines to transfer controlled amounts of lubricant to all of the remotely located booster compressors, rather than by having to run separate oil lines to each of the booster compressors from a common oil sump in the condensing equipment location. The present lubrication system is illustrated in FIGS. 2 and 3, with FIG. 2 showing the portions of the apparatus disposed in the condensing location or equipment room and FIG. 3 showing how lubrication is handled in each of the booster compressors.

With reference to FIG. 2, a conventional oil separator 100 is connected into discharge line 22 between the most-downstream high-stage compressor and the condenser. Discharge gas from the high-stage compressors enters the separator 100 as shown and impinges against a baffle 102 which facilitates the separation of any oil entrained therein, the oil dropping to an oil sump 104 at the bottom of the separator, with the discharge vapor continuing on its way to the condenser via the discharge line, indicated at 22' in FIG. 2. Oil separator 100 has a float valve 106 therein which controls the flow of lubricant from sump 104 through a conduit 108 to an oil reservoir 110. Float valve 106 is arranged so that when the level of sump 104 is above a predetermined amount the valve is opened and oil is permitted to flow through conduit 108 to reservoir 110, and when sump 104 is below that level the float valve is closed to prevent such flow of oil. The top of oil reservoir 110 is vented to inter-stage pressure line 40 via a pressure relief valve 112 which prevents the pressure in reservoir 110 from reaching excessive levels. Oil reservoir 110 is connected to the high-stage compressors in the usual manner. Shown in FIG. 2 is a unique arrangement for high-stage refrigeration compressors of the semi-hermetic type which are provided with an oil sump with a float valve therein, such as indicated in representative fashion at 114, with the float valve being generally indicated at 116. The bottom of reservoir 110 is connected via a conduit 118 to float valve 116 so that when the oil in the sump 114 drops below a predetermined level float valve 116 opens and permits oil to flow from the reservoir to the compressor sump. When the level is at or above this predetermined level float valve 116 is closed to prevent such flow of oil. Relief valve 112 will cause the pressure in reservoir 110 to stay somewhat above inter-stage pressure so that there will always be a positive pressure differential to feed oil from the reservoir to the high-stage compressor sumps, which are at or close to suction pressure.

A technique by which it is assured there is always a supply of oil to the booster compressors resides in the provision of a semi-capillary line connected between the sump of oil separator 100 and receiver 32. Because there is a positive pressure differential between the oil separator and the receiver (due to the normal pressure drop across an air-cooled condenser), the semi-capillary line 120 will meter a limited quantity of lubricant to the liquid refrigerant in receiver 32. Instead of a semi-capillary line, if desired, a small metering pump may be provided, or alternatively a full dimensioned conduit with an orifice therein. What is required is that there be a continuous but limited supply of lubricant into the refrigerant being supplied to the various booster compressors.

Since the booster compressors are preferably relatively small hermetic-type compressors, shown in FIG. 3 somewhat diagrammatically is a manner in which each such compressor could be modified to accommodate overall system lubrication. The compressor generally comprises a hermetic shell 200 in which is disposed a reciprocating compressor 202 driven by a motor 204 disposed within a housing 206 having a cover 208. It is assumed that the compressor is of the low-side type in which suction gas is used to facilitate cooling of the motor, in which case suction gas will enter through a suction inlet 210 and flow-through openings 212 in cover 208, from which it will flow downwardly through the motor and into the compressor via passages 214 and 216. As will be appreciated the lower portion of the motor housing, indicated at 218, is a zone of minimum pressure within the compressor. This zone is normally vented as at 220, but one aspect of the present invention concerns the provision of special oil control means comprising a downwardly extending oil control vent tube 222. As is conventional, the bottom of shell 200 contains a lubricating oil sump 224, the normal level of which is indicated at 226, also exposed to suction gas. Oil entrained in the suction gas is mechanically separated therefrom as the gas makes a sharp turn into cover 208 and drips directly into sump 224 in the manner shown.

As can be appreciated, there will be a steady supply of oil to each of the booster compressors from receiver 32. In the event any one of them starts accumulating oil significantly in excess of its normal level 216, then the oil level will raise to the bottom of tube 222, and because of the pressure differential will be drawn up vent tube 212 and slowly ingested into the compressor, from which it will be pumped through the system with the refrigerant vapor. If a high-side type compressor is used the discharge line could enter the shell at the point of maximum oil level so that excess oil would automatically flow out of the compressor with the discharged refrigerant. The supply of oil into the receiver 32 via line 120 will insure that the oil level in each of the booster compressors does not fall to too low a level. Preferably, the semi-capillary line 120 is connected to receiver 32 adjacent the top of the liquid level so as to provide for good distribution of the lubricant throughout the liquid refrigerant. Lubricant in the evaporators in the display cases will return to the booster compressors relatively easily because they are also located in the same place and at a similar level as the evaporator. The booster compressors will warm it up and pump it back through the vapor line to the high-stage equipment in the condensing location. The overall system therefore provides very positive oil control.

If hermetic-type compressors are used for the high-stage compressors, rather than those of the semi-hermetic type, then the internal oil control of each compressor can be such as described with respect to the booster compressors. The apparatus of FIG. 2 would not be required and the system would be as shown in FIG. 1.

Under normal operating conditions the high-stage compressors are modulated in the conventional manner, or in the manner disclosed in one of applicant's above-identified parent applications, e.g. to maintain interstage pressure. Under low condensing temperatures, however, it is contemplated that all of the high-stage compressors will be shut off, with only the booster compressors handling the cooling load. Bypass line 25 permits refrigerant to bypass the high-stage under these conditions. Subcooling is now provided by trimmer compressor 24 and check valve 42 prevents the trimmer compressor from drawing on the booster discharge vapor, thus causing it to draw only from the sub-cooler.

FIG. 4 is believed to be self-explanatory. It illustrates how a typical supermarket system embodying the principles of the present invention would operate. The solid evaporating and booster compression lines represent minimum display case evaporating pressure conditions, with the generally parallel dashed lines representing different booster compressors in the system operating at different display case conditions.

In FIG. 5 there is illustrated a modification of the system which could be used in installations having extremely large display cases. The display case 312 of FIG. 6 contains all the components of display case 12 of FIG. 1 (like reference numerals being used) with the exception that two booster compressors 360 are provided in parallel rather than a single booster compressor. The vapor exiting liquid/suction heat exchanger 52 is fed to the suction inlets of each of the compressors 360 in the manner shown with the discharge of both compressors being fed to vapor line 66. Compressors 360 can be of different capacities, can be fixed speed or variable speed, or any combination thereof, depending upon the requirements of the particular application in which they are utilized.

In FIG. 6 there is illustrated an embodiment of the present invention which might be used in applications having relatively small display cases, i.e. too small to warrant an individual booster compressor in each one. Display cases 412 and 413 are two such cases. As can be seen, display case 413 is provided with a booster compressor 360 and a liquid/suction heat exchanger 52, whereas display case 412 is provided with an expansion valve 56. Both display cases are provided with an evaporator 58 in the usual manner. In the arrangement of FIG. 6, liquid line 50 passes through heat exchanger 52 in the usual manner in display case 412 and thereafter flows through a liquid line 418 (preferably insulated as at 420 between the display cases) to expansion valve 56 is display case 412. The expanded refrigerant then flows through evaporator 58 is display case 412 to cool product therein and then via a vapor line 414, preferably insulated as at 416, to evaporator 58 in display case 413 to cool the product therein. Expansion valve 56 can be controlled in the usual manner in response to the temperature of the outlet from evaporator 58 in display case 413 by means of sensor 62. The refrigerant discharged from the evaporator in display case 413 passes through heat exchanger 52 and into booster compressor 460 which compresses it in the normal manner and discharge it into vapor line 66 which is connected to the interstage manifold. The system can be cycled in the conventional manner.

Insofar as reliability is concerned, the low-stage booster compressors can be of the full hermetic-type, thus assuring minimal refrigerant leakage. They can also be equipped with four pole motors operating at either variable or fixed speeds. The pressure differentials and ratios these compressors are exposed to will always be low and it is believed that they will last as long as the cases in which they will be disposed. Lubrication will always be assured through use of the above-described unique, but very simple, lubrication system that constantly feeds a small and controlled amount of oil to the booster compressors. The internal oil sump vent tube in each booster compressor prevents an excessive build-up of oil level in the sump by causing a controlled aspiration of oil to be drawn into the compression chamber. This oil will then be automatically carried via the warm vapor leaving the booster compressor on to the high-stage compressors where either similar or conventional oil control methods will be utilized, depending on the type of compressors used. Similarly, the high-stage compressors will never operate at extreme pressure differentials or ratios (such as the levels at which refrigeration compressors normally operate), but instead will operate at a lower discharge pressure than a standard air conditioning compressor and at about the same suction pressure as an air conditioning compressor (refrigeration condensers are normally selected for lower condensing temperatures than are air conditioning condensers).

Thus, it can be easily seen that the entire system always operates at moderate temperatures and pressures, never experiencing the high ratios, differentials, and temperatures that present day supermarket refrigeration systems expose compressors to. The system also has more potential redundancy than a conventional system because one high-stage bank of compressors may handle many significantly different evaporating pressure levels, thus allowing cooled product to be moved from one system to another in the event of system failure. It is also a "minimum charge" system, with attendant reduced chance of slugging, because the subcooler eliminates the need for the excess refrigerant charge normally required for low ambient condenser flooding purposes.

With respect to noise, since the booster compressors are in the confines of the display cases, noise is a consideration. However, the pressure ratios and differentials are so low that smooth vapor flow is virtually assured, along with uniform motor loading. Both of these factors contribute to low noise and vibration. Also, the boosters will be operated at RPM levels consistent with very low noise generation, i.e. possibly at four pole speed. Very low pressure ratios/differentials and low speed are always consistent with low noise/vibration and high efficiency especially when utilizing mechanical compressor running gear designed for higher speeds. Furthermore, the present system permits the use of full hermetic type high-stage compressors in the condensing equipment room, which could provide some reduction in equipment room noise and vibration. The use of smaller diameter vapor lines to the display cases should also reduce noise.

Because the booster compressors can be standard air conditioning compressors, with the exception of the use of smaller motors and an oil control economies in cost should be realized. This particularly true if full hermetic air conditioning compressors, with an oil control vent, are used for the high-stage compressors. Also the vapor lines from the display cases will not have to be insulated, only the small liquid lines, thus reducing installation cost. The elimination of normally required evaporator pressure regulating valves for display case temperature control purposes further reduces equipment cost.

While it will be apparent that the preferred embodiments of the inventin disclosed are well calculated to provide the advantages and features above stated, it will be appreciated that the invention is susceptible to modification, variation and change without departing from the proper scope or fair meaning of the subjoined claims.

I claim:

1. A multistage refrigeration system for product-display cases, comprising:
   (a) a housing defining a temperature controlled refrigerating zone;
   (b) expansion and evaporating means disposed in said housing for utilizing pressurized liquid refrigerant to refrigerate said refrigerating zone;
   (c) high-stage compressor means and condenser means connected in series and disposed in an equipment location remote from said housing for supplying pressurized liquid refrigerant;
   (d) first conduit means for communicating pressurized liquid refrigerant from said condenser means to said expansion and evaporating means;
   (e) a low-stage refrigeration compressor disposed in said housing for compressing gaseous refrigerant received from said evaporating means, said low-stage compressor operating in response to the cooling load in said refrigerating zone to maintain the desired temperature in said refrigerating zone;
   (f) second conduit means for communicating compressed refrigerant from said low-stage compressor to said high-stage compressor means in said equipment location; and
   (g) said low-stage compressor has a lubricant sump and oil control means for introducing exess lubricant in said low-stage compressor sump into said compressed refrigerant discharged from said low-stage compressor.

2. A multistage refrigeration system as claimed in claim 1, wherein said control means comprises a vent tube extending from a zone of minimum pressure in said low-stage compressor to a point slightly above the normal lubricant level in said low-stage compressor sump.

3. A multistage refrigeration system as claimed in claim 2, wherein said high-stage compressor means and said low-stage compressor are full hermetic compressors.

4. A multistage refrigeration system as claimed in claim 3, wherein said high-stage compressor means has the same lubricant control means as said low-stage compressor.

5. A multistage refrigeration system for product-display cases, comprising:
   (a) a housing defining a temperature controlled refrigerating zone;
   (b) expansion and evaporating means disposed in said housing for utilizing pressurized liquid refrigerant to refrigerate said refrigerating zone;
   (c) high-stage compressor means and condenser means connected in series and disposed in an equipment location remote from said housing for supplying pressurized liquid refrigerant;
   (d) first conduit means for communicating pressurized liquid refrigerant from said condenser means to said expansion and evaporating means;
   (e) a low-stage refrigeration compressor disposed in said housing for compressing gaseous refrigerant received from said evaporating means, said low-stage compressor operating in response to the cooling load in said refrigerating zone to maintain the desired temperature in said refrigerating zone;
   (f) second conduit means for communicating compressed refrigerant from said low-stage compressor to said high-stage compressor means in said equipment location; and
   (g) a liquid/suction heat exchanger disposed in said housing for utilizing cold refrigerant vapor for said evaporating means to cool liquid refrigerant supplied to said expansion and evaporating means.

6. A multistage refrigeration system as claimed in claim 5, wherein said low-stage compressor cycles on and off in response to cooling demand.

7. A multistage refrigeration system as claimed in claim 5, wherein said low-stage compressor operates at different speeds in response to cooling demand.

8. A multistage refrigeration system as claimed in claim 5, wherein said low-stage compressor operates solely in response to the cooling load in said refrigerating zone.

9. A multistage refrigeration system as claimed in claim 8, wherein said low-stage compressor is controlled by a refrigerator-type thermostat disposed in said refrigerating zone.

10. A multistage refrigeration system as claimed in claim 5, further comprising a subcooler for subcooling refrigerant flowing from said condenser means to said expansion and evaporating means.

11. A multistage refrigeration system as claimed in claim 10, wherein said subcooler normally expands a portion of the condensed refrigerant downstream of said condenser means for subcooling refrigerant flowing to said expansion and evaporator means, and further comprising means for feeding said expanded portion of refrigerant to the inlet of said high-stage compressor means.

12. A multistage refrigeration system as claimed in claim 5, wherein said high-stage compressor means comprises a plurality of high-stage compressors connected in parallel.

13. A multistage refrigeration system as claimed in claim 12, wherein one of said high-stage compressors is a variable speed compressor.

14. A multistage refrigeration system as claimed in claim 12, further comprising a trimmer compressor connected in parallel with said plurality of high-stage compressors, said trimmer compressor being of smaller capacity than each of the other high-stage compressors.

15. A multistage refrigeration system as claimed in claim 14, wherein said trimmer compressor is a variable speed compressor.

16. A multistage refrigeration system as claimed in claim 5, further comprising a conduit bypassing said high-stage compressor means, and a check valve in said conduit to prevent reverse refrigerant flow in said system.

17. A multistage refrigeration system as claimed in claim 5, further comprising lubricant control means for controlling the distribution of lubricant between said high-stage compressor means and said low-stage compressor.

18. A multistage refrigeration system as claimed in claim 5, further comprising a second low-stage refrigerating compressor disposed in said housing and connected to parallel to said first-mentioned low-stage compressor.

19. A multistage refrigeration system as claimed in claim 18, wherein at least one of said low-stage compressors is a variable speed compressor.

20. A multistage refrigeration system as claimed in claim 18, wherein each of said low-stage compressors is a fixed speed compressor.

21. A multistage refrigeration system for product-display cases, comprising:
 (a) a housing defining a temperature controlled refrigerating zone;
 (b) expansion and evaporating means disposed in said housing for utilizing pressurized liquid refrigerant to refregierate said refrigerating zone;
 (c) high-stage compressor means and condenser means connected in series and disposed in an equipment location remote from said housing for supplying pressurized liquid refrigerant;
 (d) first conduit means for communicating pressurized liquid refrigerant from said condenser means to said expansion and evaporating means;
 (e) a low-stage refrigeration compressor disposed in said housing for compressing gaseous refrigerant received from said evaporating means, said low-stage compressor operating in response to the cooling load in said refrigerating zone to maintain the desired temperature in said refrigerating zone;
 (f) second conduit means for communicating compressed refrigerant from said low-stage compressor to said high-stage compressor means in said equipment location; and
 (g) a lubricant sump associated with said high-stage compressor means, and means for metering a small flow of lubricant from said sump to said pressurized liquid refrigerant supplied to said expansion and evaporating means.

22. A multistage refrigeration system as claimed in claim 21, wherein said low-stage compressor has a lubricant sump and oil control means for introducing excess lubricant in said low-stage compressor sump into said compressed refrigerant discharged from said low-stage compressor.

23. A multistage refrigeration system as claimed in claim 22, wherein said control means comprises a vent tube extending from a zone of minimum pressure in said low-stage compressor to a point slightly above the normal lubricant level in said low-stage compressor sump.

24. A refrigeration system comprising:
 (a) a low-stage compressor for discharging compressed refrigerant into a high-stage suction line;
 (b) a high-stage discharge line;
 (c) first and second high-stage compressors connected in parallel between said suction and discharge lines;
 (d) a condenser and evaporating means connected in series between said discharge line and the inlet of said low-stage compressor; and
 (e) a subcooler for expanding a portion of the condensed refrigerant downstream of said condenser for subcooling refrigerant flowing to said evaporating means, and including conduit means for feeding said expanded portion of refrigerant to said suction line,
 (f) said second compressor being upstream of said first compressor with respect to the output of said subcooler;
 (g) said first compressor being upstream of said second compressor with respect to the output of said low-stage compressor, and
 (h) a check valve in said suction line between said first and second compressors so that said second compressor can maintain subcooling when said first compressor is not operating.

25. A refrigeration system as claimed in claim 24, wherein said second compressor is of less capacity than said first compressor.

26. A refrigeration system as claimed in claimed 25, wherein said second compressor operates continuously to trim the output of said first compressor.

27. A refrigeration system as claimed in claim 25, wherein said second compressor is a variable speed compressor.

28. A refrigeration system as claimed in claim 25, further comprising a bypass line between said suction and discharge lines, said bypass line having a check valve therein to prevent flow from said discharge line to said suction line, said bypass line being connected to said suction line downstream of said second compressor with regard to said subcooler.

29. A refrigeration system as claimed in claim 25, wherein said high-stage compressors are disposed in an equipment room and said low-stage compressor is disposed in a remotely located product-display case.

30. A refrigeration system comprising:
 (a) a low-stage compressor for discharging compressed refrigerant into a high-stage suction line;
 (b) a high-stage discharge line;
 (c) high-stage compressor means connected between said suction and discharge lines;
 (d) a lubricant separator, a condenser, a refrigerant receiver and evaporator means connected in that order in series between said discharge line and the inlet of said low-stage compressor; and
 (e) feed means for metering on a continuous basis a small quantity of lubricant from said lubricant separator to said receiver to provide a source of lubricant for said low-stage compressor.

31. A refrigeration system as claimed in claim 30, wherein said feed means comprises a semi-capillary line.

32. A refrigeration system as claimed in claim 30, wherein said lubricant is introduced into said receiver near the top of the level of liquid refrigerant therein.

33. A refrigeration system as claimed in claim 30, comprising a plurality of said low-stage compressors connected in parallel.

34. A refrigeration system as claimed in claim 30, wherein said high-stage compressor means is disposed in an equipment room and said low-stage compressor is disposed in a remotely located product-display case.

35. A multistage refrigeration system comprising:
 a first housing defining a first refrigerating zone;
 first evaporating means disposed in said first housing for utilizing pressurized refrigerant to refrigerate said first refrigerating zone;
 a second housing defining a second refrigerating zone;
 second evaporating means disposed in said second housing for utilizing pressurized refrigerant to refrigerate said second refrigerating zone;
 high-stage compressor means and condenser means connected in series and disposed in a location remote from said first and second housings for supplying pressurized liquid refrigerant;
 first conduit means for communicating pressurized liquid refrigerant from said condenser means to said second evaporating means;
 second conduit means for communicating refrigerant from said second evaporating means to said first evaporating means;

a low-stage refrigerating compressor disposed in said first housing for compressing gaseous refrigerant received from said first evaporating means; and third conduit means for communicating compressed refrigerant from said low-stage compressor to said high-stage compressor means.

36. A multistage refrigeration system as claimed in claim 35, further comprising refrigerant expansion means disposed in said second housing between said first conduit and said second evaporating means.

37. A multistage refrigeration system as claimed in claim 36, wherein said expansion means is controlled by the output temperature of said first evaporating means.

38. A multistage refrigeration system as claimed in claim 35, wherein said first conduit means passes through said first housing.

39. A multistage refrigeration system as claimed in claim 38, further comprising a liquid-suction heat exchanger disposed in said first housing for utilizing cool refrigerant from said second evaporating means to cool liquid refrigerant in said first conduit.

40. A multistage refrigeration system comprising:
a first housing defining a first refrigerating zone having individual temperature control, including a first thermostat;
first expansion and evaporating means disposed in said first housing for utilizing pressurized liquid refrigerant to refrigerate said first refrigerating zone;
a second housing defining a second refrigerating zone having individual temperature control, including a second thermostat;
second expansion and evaporating means disposed in said second housing for utilizing pressurized liquid refrigerant to refrigerate said second refrigerating zone;
high-stage compressor means and condenser means connected in series and disposed in a location remote from said first and second housings for supplying pressurized liquid refrigerant;
first conduit means for communicating pressurized liquid refrigerant from said condenser means to said first and second expansion and evaporating means;
a first low-stage refrigerating compressor disposed in said first housing for compressing gaseous refrigerant received from said first evaporating means, said first low-stage compressor being controlled by said first thermostat to maintain the desired temperature in said first refrigerating zone;
a second low-stage refrigerant compressor disposed in said second housing for compressing gaseous refrigerant received from said second evaporating means, said second low-stage compressor being controlled by said second thermostat to maintain the desired temperature in said second refrigerating zone;
second conduit means for communicating compressed refrigerant from said first and second low-stage compressors to said high-stage compressor means; and
means independent of said first and second thermostat for controlling operation of said high stage compressor means.

41. A multistage refrigeration system as claimed in claim 40, wherein said low-stage compressors cycle on and off in response to cooling demand.

42. A multistage refrigeration system as claimed in claim 40, wherein said low-stage compressors operate at different speeds in response to cooling demand.

43. A multistage refrigeration system as claimed in claim 40, further comprising a liquid/suction heat exchanger disposed in each said housing for utilizing cold refrigerant vapor from evaporating means disposed therein to cool liquid refrigerant supplied to said expansion and evaporating means disposed therein.

44. A multistage refrigerant system as claimed in claim 40, further comprising a subcooler for subcooling refrigerant flowing from said condenser means to each of said expansion and evaporating means.

45. A multistage refrigeration system as claimed in claim 44, wherein said subcooler normally expands a portion of the condensed refrigerant downstream of said condenser means for subcooling refrigerant flowing to each of said expansion and evaporator means, and further comprising means for feeding said expanded portion of refrigerant to the inlet of said high-stage compressor means.

46. A multistage refrigeration system as claimed in claim 40, wherein said high-stage compressor means comprises a plurality of high-stage compressors connected in parallel.

47. A multistage refrigeration system as claimed in claim 46, wherein one of said high-stage compressors is a variable speed compressor.

48. A multistage refrigeration system as claimed in claim 46, further comprising a trimmer compressor connected in parallel with said plurality of high-stage compressors, said trimmer compressor being of smaller capacity than each of the other high-stage compressors.

49. A multistage refrigeration system as claimed in claim 48, wherein said trimmer compressor is a variable speed compressor.

50. A multistage refrigeration system as claimed in claim 40, further comprising lubricant control means for controlling the distribution of lubricant between said high-stage compressor means and said low-stage compressors.

51. A multistage refrigeration system as claimed in claim 40, wherein said high-stage compressor means comprises a plurality of semi-hermetic type compressors connected in parallel, and each of said low-stage compressors is a full hermetic type compressor.

52. A multistage refrigeration system comprising:
a first housing defining a first refrigerating zone having individual temperature control, including a first thermostat;
first expansion and evaporating means disposed in said first housing for utilizing pressurized liquid refrigerant to refrigerate said first refrigerating zone;
a second housing defining a second refrigerating zone having individual temperature control, including a second thermostat;
second expansion and evaporating means disposed in said second housing for utilizing pressurized liquid refrigerant to refrigerate said second refrigerating zone;
high-stage compressor means and condenser means connected in series and disposed in a location remote from said first and second housings for supplying pressurized liquid refrigerant;
first conduit means for communicating pressurized liquid refrigerant from said condenser means to said first and second expansion and evaporating means;

a first low-stage refrigerating compressor disposed in said first housing for compressing gaseous refrigerant received from said first evaporating means, said first low-stage compressor being controlled by said first thermostat to maintain the desired temperature in said first refrigerating zone;

a second low-stage refrigerant compressor disposed in said second housing for compressing gaseous refrigerant received from said second evaporating means, said second low-stage compressor being controlled by said second thermostat to maintain the desired temperature in said second refrigerating zone;

second conduit means for communicating compressed refrigerant from said first and second low-stage compressors to said high-stage compressor means; and a lubricant sump associated with said high-stage compressor means and means for metering a small flow of lubricant from said sump to said pressurized liquid refrigerant supplied to each of said expansion and evaporating means.

53. A multistage refrigeration system as claimed in claim 52, wherein each said low-stage compressor has a lubricant sump and oil control means for introducing excess lubricant in said low-stage compressor sump into the compressed refrigerant discharged from said low-stage compressor.

54. A multistage refrigeration system as claimed in claim 53, wherein said control means coprises a vent tube extending from a zone of minimum pressure in each said low-stage compressor to a point slightly above the normal lubricant level therein.

55. A multistage refrigeration system comprising:

a first housing defining a first refrigerating zone having individual temperature control, including a first thermostat;

first expansion and evaporating means disposed in said first housing for utilizing pressurized liquid refrigerant to refrigerate said first refrigerating zone;

a second housing defining a second refrigerating zone having individual temperature control, including a second thermostat;

second expansion and evaporating means disposed in said second housing for utilizing pressurized liquid refrigerant to refrigerate said second refrigerating zone;

high-stage compressor means and condenser means connected in series and disposed in a location remote from said first and second housings for supplying pressurized liquid refrigerant;

first conduit means for communicating pressurized liquid refrigerant from said condenser means to said first and second expansion and evaporating means;

a first low-stage refrigerating compressor disposed in said first housing for compressing gaseous refrigerant received from said first evaporating means, said first low-stage compressor being controlled by said first thermostat to maintain the desired temperature in said first refrigerating zone;

a second low-stage refrigerant compressor disposed in said second housing for compressing gaseous refrigerant received from said second evaporating means, said second low-stage compressor being controlled by said second thermostat to maintain the desired temperature in said second refrigerating zone;

second conduit means for communicating compressed refrigerant from said first and second low-stage compressors to said high-stage compressor means; and each said low-stage compressor has a lubricant sump and oil control means for introducing excess lubricant therein into the compressed refrigerant discharge therefrom.

56. A multistage refrigeration system as claimed in claim 55, wherein said control means comprises a vent tube extending from a zone of minimum pressure in each said low-stage compressor to a point slightly above the normal lubricant level therein.

57. A multistage refrigeration system as claimed in claim 56, wherein said high-stage compressor means and each of said low-stage compressors are full hermetic compressors.

58. A multistage refrigeration system as claimed in claim 57, wherein said high-stage compressor means has the same lubricant control means as each said low-stage compressor.

* * * * *

UNITED STATES PATENT AND TRADEMARK OFFICE
CERTIFICATE OF CORRECTION

PATENT NO. : 4,748,820

DATED : June 7, 1988

INVENTOR(S) : David N. Shaw

It is certified that error appears in the above-identified patent and that said Letters Patent is hereby corrected as shown below:

Column 2, line 11, "from" should be -- for --.

Column 2, line 14, "conditiioning" should be -- conditioning --.

Column 2, line 42, "ribbing" should be -- robbing --.

Column 3, line 29, "sytem" should be -- system --.

Column 3, line 30, "compressors" should be -- Compressors --.

Column 3, line 49, "live" should be -- line --.

Column 3, line 63, "22" should be -- 21 --.

Column 4, line 14, "is" should be -- it --.

Column 4, line 54, after "more" insert -- control --.

Column 6, line 33, "216" should be -- 226 --.

Column 7, line 19, "6" should be -- 5 --.

Column 7, line 37, "360" should be -- 460 --.

Column 7, line 42, "412" should be -- 413 --.

UNITED STATES PATENT AND TRADEMARK OFFICE
CERTIFICATE OF CORRECTION

PATENT NO. : 4,748,820

DATED : June 7, 1988

INVENTOR(S) : David N. Shaw

It is certified that error appears in the above-identified patent and that said Letters Patent is hereby corrected as shown below:

Column 7, line 45, "is" should be -- in --.

Column 7, line 46, "is" should be -- in --.

Column 7, lines 55, 56, "discharge" should be -- discharges --.

Column 8, line 55, after "control" insert -- vent --.

Column 8, line 56, after "This" insert -- is --.

Column 8, line 65, "inventin" should be -- invention --.

Column 10, line 4, "for" should be -- from --.

Column 11, line 7, "refregierate" should be -- refrigerate --.

Column 9, line 29, "exess" should be -- excess --.

Column 12, line 1, "refirgeration" should be -- refrigeration --.

Column 15, line 32 "coprises" should be -- comprises --.

Signed and Sealed this

Fourth Day of July, 1989

Attest:

DONALD J. QUIGG

*Attesting Officer*  *Commissioner of Patents and Trademarks*